(12) United States Patent
Tartakovsky et al.

(10) Patent No.: US 6,599,425 B2
(45) Date of Patent: Jul. 29, 2003

(54) BIOREMEDIATION OF NITRATE CONTAMINATED GROUNDWATER

(75) Inventors: Boris Tartakovsky, Cote St-Luc (CA); Serge Guiot, Montreal (CA); Jerome Breton, St-Lambert (CA); Serge Delisle, Montreal (CA)

(73) Assignee: National Research Council of Canada, Ottawa (CA)

( * ) Notice: Subject to any disclaimer, the term of this patent is extended or adjusted under 35 U.S.C. 154(b) by 223 days.

(21) Appl. No.: 09/891,540

(22) Filed: Jun. 27, 2001

(65) Prior Publication Data

US 2002/0020664 A1 Feb. 21, 2002

Related U.S. Application Data

(60) Provisional application No. 60/216,373, filed on Jul. 5, 2000.

(51) Int. Cl.[7] .................................................. C02F 3/00
(52) U.S. Cl. ........................ 210/610; 210/98; 210/105
(58) Field of Search ........................... 210/610, 98, 105

(56) References Cited

PUBLICATIONS

A. Mohsemi—Bandpi, et al Wat. Sci. Tech. vol. 40, No. 2, pp. 53–59, 1999.

*Primary Examiner*—Chester T. Barry
(74) *Attorney, Agent, or Firm*—George A. Seaby

(57) ABSTRACT

The invention disclosed relates to a method and apparatus for the denitrification of groundwater in situ in an aquifer under substantially anaerobic conditions, the method comprising
(a) providing a network, including an extraction well for removal of groundwater from the aquifer and a plurality of injection wells for returning groundwater to the aquifer, the injection wells being arranged in a line substantially perpendicular to the direction of groundwater flow, the extraction well being located downstream or upstream of the line of injection wells, and the spacing of the wells and the number of injection wells being determined by the mathematical relationship $$J = \frac{C_p + nC_1}{W} \to \min \qquad (1)$$

where J is the cost of treatment, $C_P$ and $C_I$ are the costs of extraction and injection wells, respectively; n is the number of injection wells, and W is the distance across the protected area, and wherein the water stream is evenly distributed between injection wells, according to the relationship:

$$F_i = F_e/n = const \qquad (2)$$

where F is the water flow rate (e—extraction well, i—injection well) and n is the number of injection wells,
(b) removing groundwater from the aquifer by the extraction well,
(c) adding a carbon source to the groundwater in a controlled manner,
(d) returning the carbon source amended groundwater to the aquifer by the injection wells in even distribution, the water flow rate being controlled, and
(e) monitoring the nitrate concentration of the groundwater removed from the extraction well, a decrease in nitrate concentration being indicative of denitrification.

12 Claims, 6 Drawing Sheets

BIOREMEDIATION OF NITRATE CONTAMINATED GROUNDWATER

This application claims benefit of provisional application No. 60/216,373, filed Jul. 5, 2000.

BACKGROUND OF THE INVENTION

This invention relates to the remediation of nitrate contaminated aquifers, such as in agricultural areas or at airports, and in particular to a method and apparatus for providing such remediation in situ.

Concern about elevated concentrations of nitrate in drinking water is growing, especially in rural areas where farming activities as well as the use of nitrate-rich fertilizers increase levels of nitrate in groundwater. Another source of nitrate in groundwater, stems from the use of urea on airport runways as a deicing agent. In this later case, urea percolation in the upper layer of soil is followed by biologically assisted hydrolysis of urea into ammonium. The aerobic nitrifying bacteria (ammonium- and nitrite-consumers) complete the transformation into nitrate. In both cases nitrates are carried with water seeping into the deeper aquifer, where they may accumulate in an aerobic environment which lacks a carbon source.

DESCRIPTION OF THE PRIOR ART

One prior art approach to the problem is described in a paper by (A. Mohseni-Bandpi, D. J. Elliot, A. Momeny-Mazdeh. Denitrification of groundwater using acetic acid as a carbon source, *Water Science Technology*, v 40, pp. 53–59.). This reference describes the treatment of groundwater in an aboveground bioreactor.

U.S. Pat. No. 5,482,630, which issued on Jan. 9, 1996 to Phillip G. Lee et al., describes a process and system for anaerobic denitrification of nitrate in a fluid medium, also in an aboveground bioreactor. The controlled addition of a carbon source is also described. Process control is based upon controlling the addition rate of the carbon source and residence time, by monitoring the oxidation-reduction potential of the process.

U.S. Pat. No. 4,683,064 of Hallberg and Martinell, dated Jul. 28, 1987, discloses an in situ approach to decreasing the nitrate content in ground water. Denitrifying organisms and/or a substrate therefore are introduced by means of a number of injection wells arranged around one or more remediated water extraction wells. The wells are arranged such that a treatment zone is remote from the extraction wells. More specifically, the reference system comprises a complex system of oxidation and reduction wells arranged in two concentric circles around an extraction well located in the centre. For denitrification, the reference patent method requires the simultaneous introduction of water containing denitrification organisms and/or a substrate therefor into some of the injection wells, while water is drawn from adjacent injection wells, to create between the injection wells an annular denitrification zone which is spaced from the extraction well. The groundwater to be treated is passed through this denitrification zone to the pure water extraction well and withdrawn therefrom. It will be appreciated that the complexity and cost of a system including such a large number of wells would be prohibitive.

SUMMARY OF THE INVENTION

This technology is aimed at bioremediation of nitrate contaminated groundwater. Certain conditions (high dissolved oxygen concentration and low content of dissolved organic compounds) combined with a nitrate source run-off may result in nitrate accumulation in groundwater. While natural attenuation (denitrification) is limited under these conditions, often indigenous denitrifying bacteria could be found in groundwater and soil samples. Therefore, activity of indigenous denitrifying populations can be improved through addition of a carbon source to groundwater. Following groundwater amendment in a carbon source, both aerobic and anaerobic bacteria proliferate. The aerobes consume oxygen thus creating anaerobic conditions required for biological denitrification.

According to one aspect of the invention, the remediation procedure involves a combination of several steps described below, which when combined form a unique process for the in situ remediation of nitrate contaminated groundwater. Following hydrogeological and geophysical site characterization, a remediation sequence is carried out as described below:

1) Microbial characterization of groundwater and soil to enumerate indigenous denitrifying bacteria. The enumeration procedure uses a mixture of sulfanilic acid and α-naphthylamine to visualize denitrifying colonies.
2) Laboratory batch denitrification tests under carbon source amended conditions to evaluate feasibility of substrate stimulated denitrification.
3) Optimization of the well setup which consists of a network of injection and extraction wells using a mathematical model. Both the distance between the wells and the number of injection wells is optimized.
4) Groundwater remediation using a mobile groundwater treatment apparatus which provides water pumping from an extraction well, carbon source addition, and water return to several injection wells.

According to another aspect of the invention, a method for biological denitrification of groundwater in situ in an aquifer under substantially anaerobic conditions is provided, comprising (a) providing a network, including an extraction well for removal of groundwater from the aquifer and a plurality of injection wells for returning groundwater to the aquifer, the injection wells being arranged in a line substantially perpendicular to the direction of groundwater flow, the extraction well being located downstream or upstream of the line of injection wells, and the spacing of the wells and the number of injection wells being determined from the solution to the following optimization(minimization) problem $$J = \frac{C_P + nC_I}{W} \to \min \quad (1)$$

where J is the cost of treatment, $C_P$ and $C_I$ are the costs of extraction and injection wells, respectively; n is the number of injection wells, and W is the distance across the protected area, and wherein the water stream is evenly distributed between injection wells, according to the relationship:

$$F_i = F_e/n = const \quad (2)$$

where F is the water flow rate (e—extraction well, i—injection well) and n is the number of injection wells, (b) removing groundwater from the aquifer by the extraction well,
(c) adding a carbon source to the groundwater in a controlled manner, (d) returning the carbon source amended groundwater to the aquifer by the injection wells in even distribution, the water flow rate being controlled, and (e) monitoring the nitrate concentration of the groundwater removed from the extraction well, a decrease in nitrate concentration being indicative of denitrification.

According to yet another aspect of the invention, an apparatus for biological denitrification of groundwater in situ in an aquifer under substantially anaerobic conditions is provided, comprising (a) network means, including an extraction well for removal of groundwater from the aquifer and a plurality of injection wells for returning groundwater to the aquifer, the injection wells being arranged in a line substantially perpendicular to the direction of groundwater flow, the extraction well being located downstream or upstream of the line of injection wells, and the spacing of the wells and the number of injection wells being determined from the solution of the following optimization(minimization) problem $$J = \frac{C_p + nC_1}{W} \to \min \quad (1)$$

where J is the cost of treatment, $C_P$ and $C_I$ are the costs of extraction and injection wells, respectively; n is the number of injection wells, and W is the distance across the protected area, and wherein the water stream is assumed to be evenly distributed between injection wells, according to the relationship:

$$F_i = F_e/n = \text{const} \quad (2)$$

where F is the water flow rate (e—extraction well, i—injection well) and n is the number of injection wells, means for removing groundwater from the aquifer by the extraction well, (b) means for adding a carbon source to the groundwater, (c) means for returning the carbon source amended groundwater to the aquifer by the injection in even distribution, (d) means for controlling water flow rate and addition of carbon source, and (e) means for monitoring the nitrate concentration of the groundwater removed from the extraction well, a decrease in nitrate concentration being indicative of denitrification of the groundwater.

BRIEF DESCRIPTION OF THE DRAWINGS

FIG. 2 is a contour map of nitrate distribution in;

DETAILED DESCRIPTION OF THE INVENTION

Figure 1:
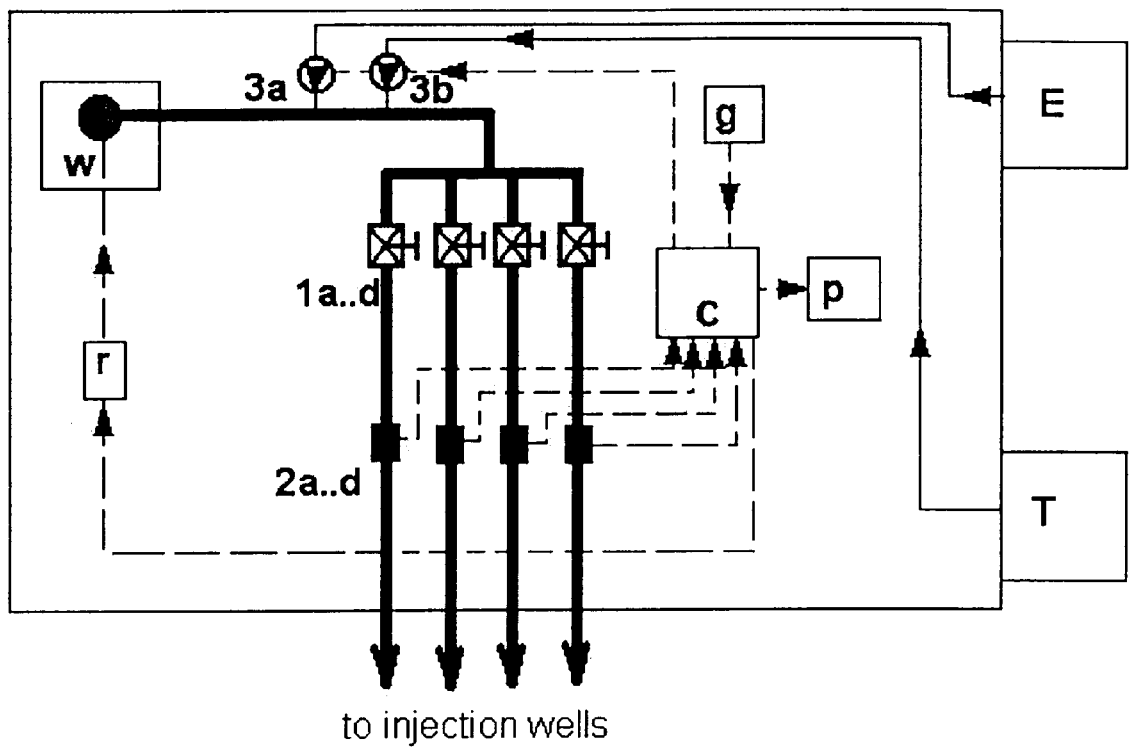
FIG. 1 is a schematic illustration of the mobile unit used for the remediation process according to the invention.

For the enumeration of indigenous denitrifying populations groundwater samples are serially diluted to obtain from 20 to 200 colonies per agar plate. The medium for denitrifying bacteria contains a carbon source (e.g., peptone and beef extract) and a source of nitrate (e.g., $KNO_3$). Plates are incubated in an atmosphere of nitrogen. Cell counts are performed after 5–7 days of incubation. The number of denitrifying colonies on a plate is determined using a membrane soaked in a mixture of sulfanilic acid (0.8% in 5 N acetic acid) and α-naphthylamine (0.5% in 5 N acetic acid). First, colonies are counted. Then, a membrane soaked in the sulfanilic acid-α naphtylamine mixture is placed on the plate, gently pressed and removed. The presence of a dense pink coloration on the membrane is indicative of denitrifying colonies.

Batch denitrification tests are used to estimate the feasibility of substrate stimulated denitrification. The tests may be carried out in sealed bottles containing soil and groundwater samples collected at the site. At the experiment startup, bottle headspace contains air, so that aerobic conditions are provided. However, no additional influx of air is provided. Also, the bottles contain a known concentration of nitrate. Carbon source (e.g. ethanol) spike is used to initiate the test. Slurry samples are withdrawn periodically and analyzed for the presence of nitrate, nitrite, and carbon source.

A setup (network) of extraction and injection wells is used for on-site in situ groundwater treatment. The basic unit of this network is comprised of a single extraction well and several injection wells. The injection wells are arranged in a line substantially perpendicular to groundwater flow (plume) direction. To determine the appropriate number of wells, duration of extraction/pumping operation, concentration of carbon source injected via the injection wells, and other operating parameters, simulations of carbon source injections are used. The simulations are carried out by using a mathematical model e.g. the RT3D transport and biodegradation model which is capable of modeling multiple electron donors such as oxygen and nitrate. See Clement, T. P. 1998. A modular computer code simulating reactive multiple species transport in 3-dimensional groundwater systems. Pacific Northwest National Laboratory. Other biodegradation and transport models such as Bioplume III (Bioplume User Manual, Rafai et al., 1998, US EPA, Cincinatti, Ohio, USA.

The simulations of the bioremediation process are aimed at the optimization of: 1) the distance between injection wells; and 2) the number of injection wells per extraction well. The optimization problem is formulated so as to minimize the specific (per width of protected area) cost of treatment (J):

$$J = \frac{C_p + nC_1}{W} \to \min \quad (1)$$

where $C_P$ and $C_I$ are the costs of extraction and injection wells, respectively; n is the number of injection wells, and W is the distance across the protected area. The water stream is assumed to be evenly distributed between injection wells, i.e:

$$F_i = F_e/n = \text{const} \quad (2)$$

where F is the water flow rate (e—extraction well, i—injection well) and n is the number of injection wells.

The optimization problem (I) is solved numerically using a minimization method e.g., Nelder-Mead simplex method (Sequential Simplex optimization, D. Brown, Ed., CRC Press, 1991) and the model (e.g. RT3D or Bioplume III). The optimization method requires a number of calculations of the objective function(J) using different distances or different number of injection wells. After the distances between the injection wells is set by the optimization method, the objective function (J) is compared using either the RT3D or Bioplume model(the model provides a width of protected area for a given set up, then a specific cost is calculated). These calculations should be repeated for different numbers of injection wells.

Also proposed is a mobile groundwater treatment apparatus for a full scale groundwater treatment. The apparatus provides groundwater pumping from an extraction well, carbon source addition, and injection (return) of groundwater to several injection wells. A schematic illustration of the mobile unit is given in FIG. 1. In FIG. 1, the following notations represent the various components. c—portable computer, E—carbon source (e.g. ethanol) tank, g—explosive gas sensor, p—cellular phone, r—submersible pump relay, T—tracer tank, w—extraction well with a submersible pump, $1a \ldots d$—water valves, $2a \ldots d$—flowmeters, $3a,b$—ethanol and tracer peristaltic pump.

It is noted that extraction of nitrate-contaminated groundwater is provided by a submersible water pump placed in the extraction well (denoted as w in FIG. 1). Water flow is evenly distributed to all injection wells using manual valves ($1a$ to $d$ in FIG. 1). Water flow rates are measured using flowmeters ($2a \ldots d$) and carbon source and conservative tracer (if required) levels are measured using level sensors installed in the tracer (T) and carbon source (E) tanks. Two peristaltic pumps ($3a$ and $3b$) provide continuous addition of the carbon source and tracer to the water stream, as shown in FIG. 1. Continuous process monitoring and control is provided by a computer (c). The control system consists of a PC-compatible computer (e.g. portable computer), a data acquisition board (e.g. DAQ Card or PC+, National Instruments, Austin, Tex.), and a software capable of displaying and saving acquired information, as well as controlling the submersible pump and the peristaltic pumps.

Another feature of the unit is a telecommunication system which provides remote access to sensors and allows a remote emergency pump shutoff. The telecommunication system consists of a cellular phone connected to a computer modem and a software (e.g. Laplink 2000, Laplink.com Inc, Bothell, Wa). The software provides file transfer and full remote access to the computer. By these means, autonomous functioning of the unit in remote locations is provided.

Ethanol is selected as a feasible source of carbon for field applications because it has high chemical oxygen demand (COD) content, it is considered non toxic at low concentrations, and is highly soluble in water. Nevertheless, other sources of carbon (e.g. other alcohols, such as methanol and molasses are also contemplated. Ethanol concentration in the injection stream is determined based on process stoichiometry. For this end, carbon source requirements to achieve complete oxygen and nitrate removal are evaluated. It is important to note that underdosage of ethanol results in incomplete denitrification, while overdosage may lead to a formation of hydrogen sulfide ($H_2S$), if groundwater contains a significant amount of sulphates.

Upon installation of required injection and extraction/pumping wells, groundwater treatment is carried out and is accompanied by monitoring/controlling the various parameters as described above, including periodic sampling. If required, such parameters as ethanol concentration and duration of extraction/pumping operation are adjusted. A significant decrease in the nitrate concentration at the extraction (pumping) well is indicative of treatment success. In particular the nitrate limit for drinking water in North America, which is 10 mg $NO_3$ as N/L (US E.P.A. 1993) can be used.

EXAMPLE 1

Extensive biochemical characterization revealed the presence of elevated concentrations of nitrate in groundwater at Bagotville Air Force Base, Quebec, Canada. Field study suggested no evidence of denitrification due to the absence of a carbon source. This finding was confirmed by simulations of nitrate transport and biodegradation using RT3D model. Consequently, the remediation sequence described above was carried out in order to decrease the level of nitrates in ground water.

Site Hydrogeology

The soil at the site consists mostly of sand (from fine to coarse) with a small amount of clay and silt. This composition provides good permeability. The sand is located above the impermeable bed of clay which constitutes the lower limit of the aquifer. The base of the aquifer varies from 10–20 m to the north of the runways to 50–70 m south of the runways.

Groundwater is present all over the site. Rivers Mars and Gauthier constitute natural limits (sinks) of the aquifer. The regional groundwater flow direction is from north west to south-east and the average regional hydraulic gradient is 0.015 m/m.

Extent of Contamination

Figure 2:
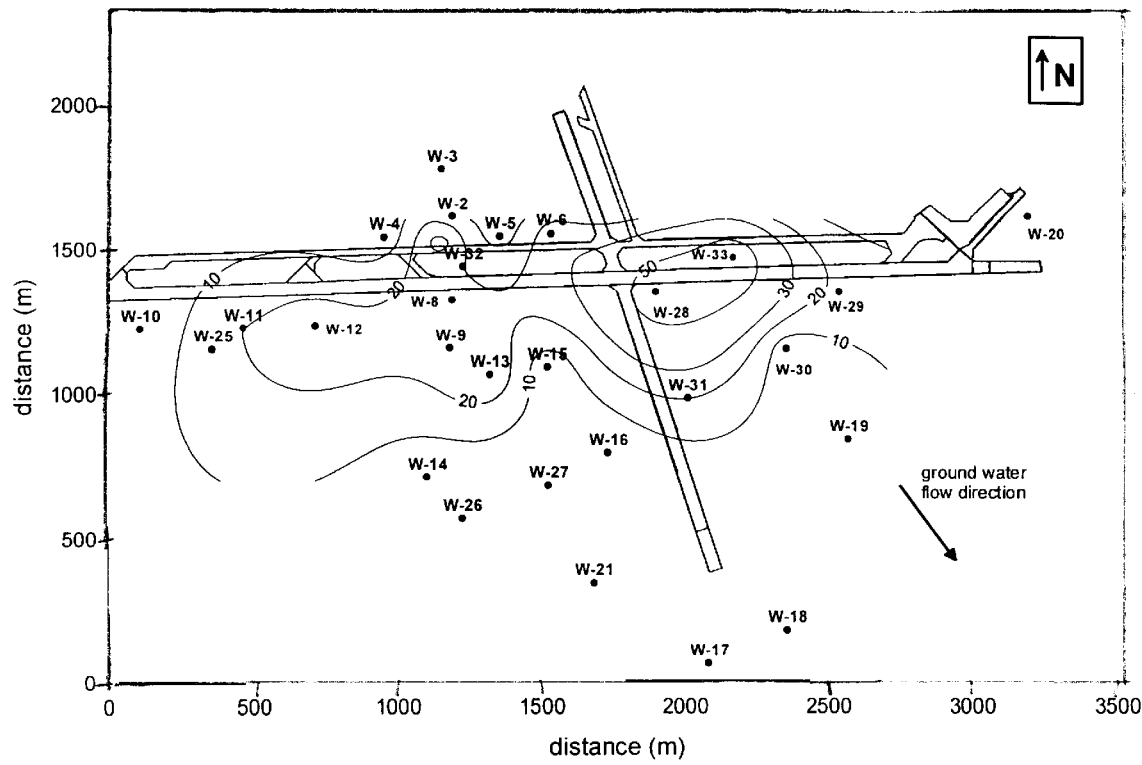

For over 40 years (from 1955 to 1995) urea was used in the amount of 100 tons per year for deicing of runways. Percolation of urea into groundwater and its transformation into nitrate by aerobic microorganisms resulted in nitrate accumulation in groundwater. In 1998 concentration of nitrates in the vicinity of runways was between 30 and 40 mg/L as shown in FIG. 2.

The amount of nitrate (expressed as nitrogen) accumulated over the 40 year period of deicing with urea was estimated at around 2000 ton. Little or no denitrification was observed at the contaminated site due to aerobic conditions which prevented denitrification from occurring.

Bacterial Populations

Figure 3:
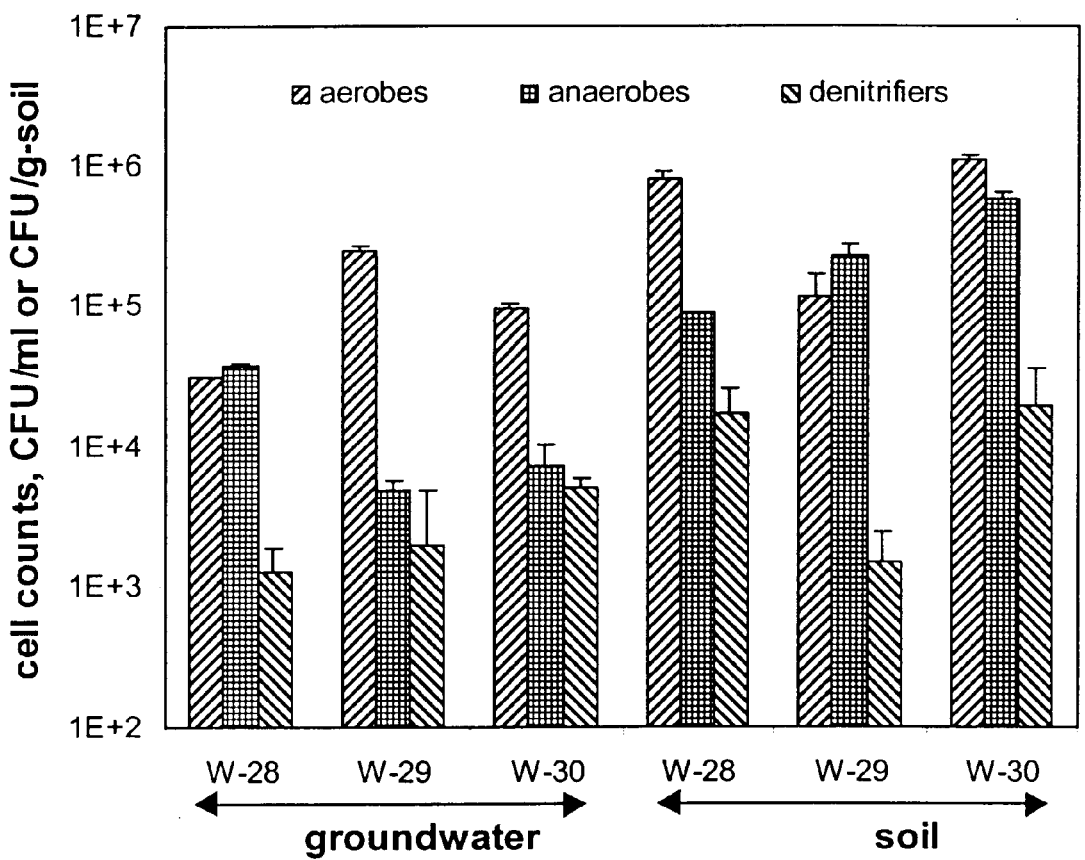
FIG. 3 shows cell counts in soil (a) and ground water (b)

Plate counts were carried out to estimate populations of aerobic, anaerobic, and denitrifying bacteria. The total number of facultative aerobic bacteria found in groundwater was $10^4$–$10^5$ CFU/ml while $10^5$–$10^6$ CFU/g were found in soil samples. These numbers should be considered normal for this type of soil. Counts of anaerobic and denitrifying bacteria in soil and groundwater show that in spite of aerobic conditions at the site, these bacteria were present. The average number of anaerobic bacteria, however, was one order of magnitude less than that of aerobes and the number of denitrifying bacteria was less than the number of anaerobes (FIG. 3). The presence of denitrifiers suggested that denitrification would be possible if a carbon source is present, though some time would be required to achieve sufficient density of denitrifiers.

Batch Denitrification Tests

Batch tests were undertaken to study the denitrification capacity of indigenous microbial populations in bioenhanced conditions, i.e. in the presence of acetate as a carbon source.

To simulate field conditions where oxygen concentration in groundwater was almost at its saturation level, the tests were started under aerobic conditions. Consequently, acetate was introduced into bottles containing aerobic slurry samples. These conditions were similar to those at the site where the flux of oxygen is limited. It was expected, that fast growing aerobic bacteria would proliferate in the presence of oxygen and a carbon source. In turn, oxygen consumption by aerobic bacteria would result in microaerobic or anaerobic conditions thus allowing for effective biological denitrification.

Figure 4:
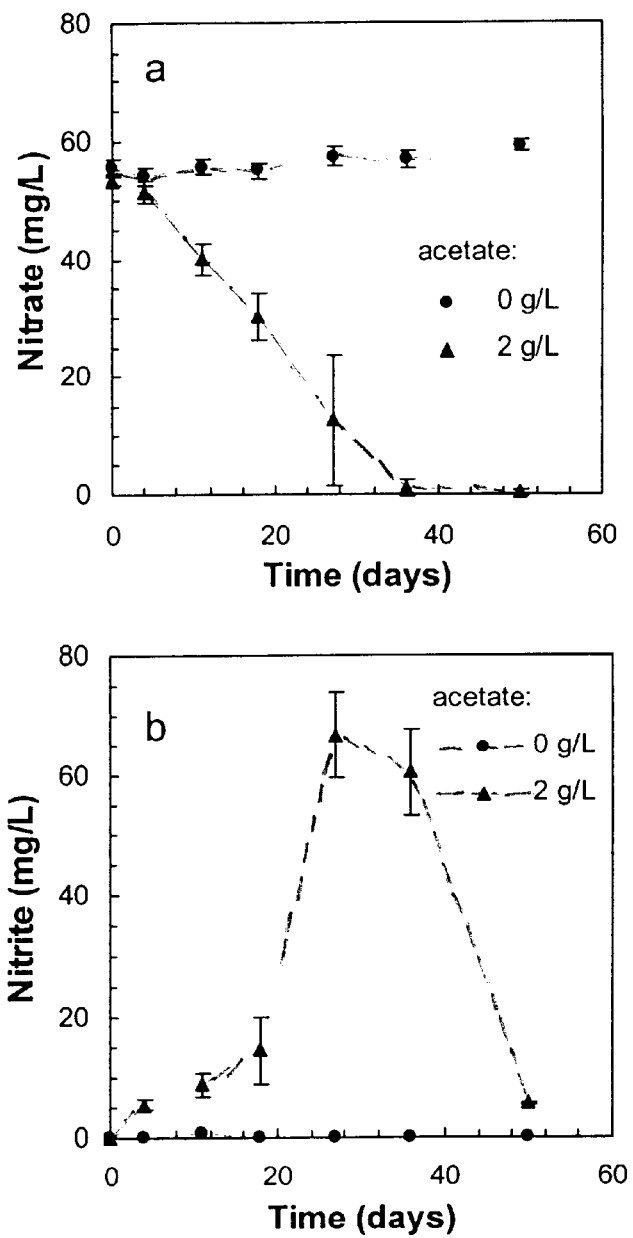
FIG. 4 shows Nitrate (a) and nitrite (b) concentrations in the batch test.

Nitrate consumption was observed in bottles with more than 0.5 g/L of acetate at t=0. The highest denitrification rate was achieved at the initial acetate concentration of 2 g/L as shown in FIG. 4.

Optimization of Well Setup

To solve problem (1) with the constraint defined by Eqn. (2) for a specific nitrate-contaminated site, the number of injection wells was varied from one to five. For each number of injection wells, ethanol addition was simulated for a period of 60 or 90 days using the RT3D model described above, and then, the simulation was continued with a zero pumping rate to evaluate the impact of ethanol addition one year after startup of the treatment. To estimate the impact, the width of area with zero nitrate content (W) was measured. After each simulation, the distance between injection wells was readjusted, if necessary, to eliminate any area of non-zero nitrate concentration between injection wells. When this condition was satisfied, the resulting value of W was used to calculate the objective function J defined by Eqn. (1).

Results shown in the FIG. 5 below suggest that the optimal number of injection wells for this setup is three, although no significant difference is predicted if either two or four injection wells are used when a duration of treatment is long enough. A one or five injection well setup, however, is significantly more expensive. The cost is determined by the ratio of well cost to protected area(see eqn. 1). In fact, the numerical method determines the largest distance between two injection wells at which nitrate does not penetrate below the line of injection wells. A smaller distance between wells increases the cost, while too large a distance between wells does not stop the contamination. Also, with only one injection well, the width of the protection area is too small, although the cost of installation is minimal. With too many injection wells, the protected area is large, but the installation cost is too high. Accordingly, the optimal solution is a trade-off. Also, the results suggest that the duration of the pumping period has a significant impact on the cost of remediation.

Field Denitrification Test

It was proposed to stimulate natural population of denitrifiers by multiple injections of a carbon source. The effect of carbon source is two-fold: first, the carbon source allows for the proliferation of aerobic bacteria which consume oxygen. At low dissolved oxygen concentrations environmental conditions become favorable for the growth of denitrifiers which use nitrate as an electron acceptor. Thus, natural denitrification is stimulated.

Figure 5:
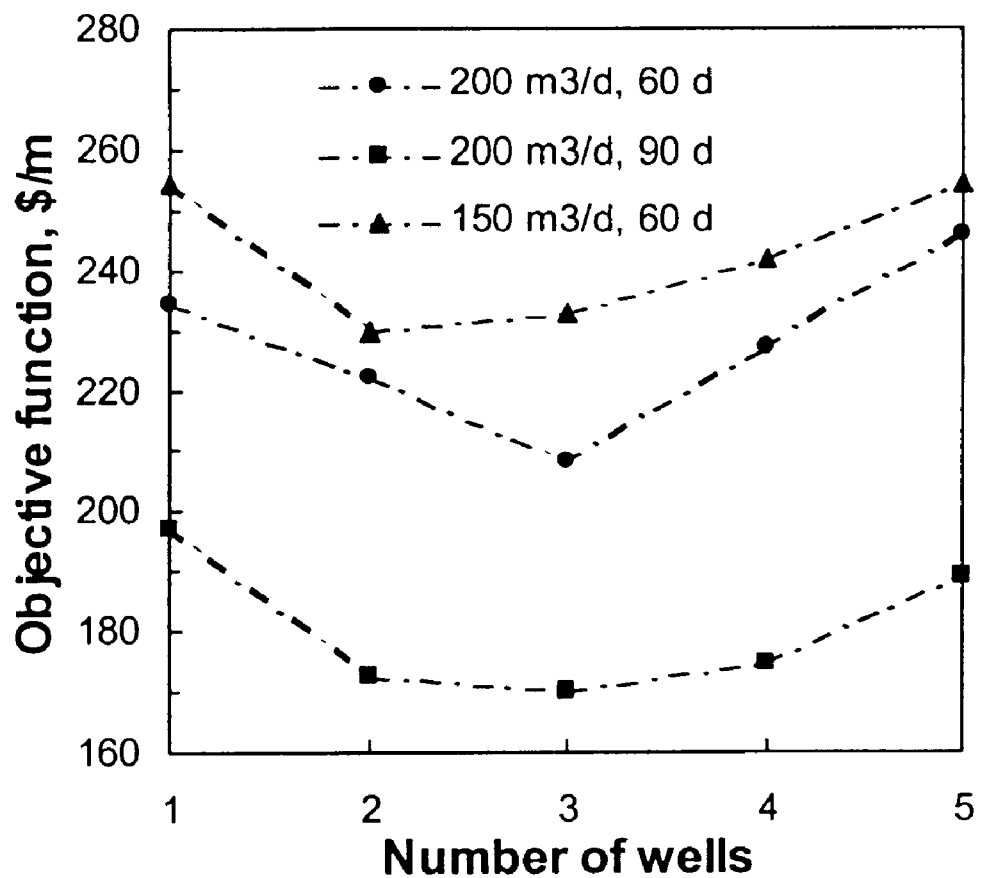
FIG. 5 is a graph illustrating the optimization of the number of wells.
Figure 6:
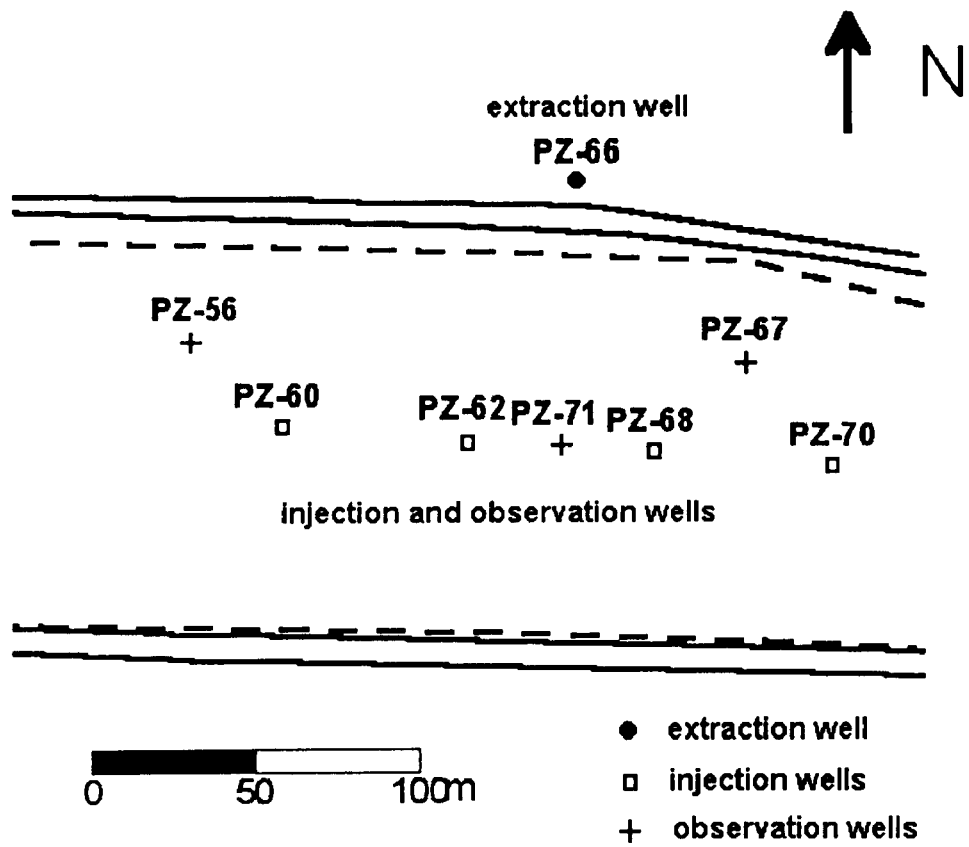
FIG. 6 is a map of a pilot test, wherein a mobile denitrification unit was installed above the extraction well.

A pilot test which consisted of groundwater pumping from the extraction well (PZ-66), addition of carbon source (ethanol, which is less expensive then acetate) to groundwater, and injection of groundwater in four injection wells (PZ-60, 62, 68, 70) was carried out in part of the nitrate contaminated area (FIG. 5). The test was carried out using a mobile denitrification unit. Components of the unit were installed in a trailer and the trailer was installed above the extraction well. Groundwater was pumped from the extraction well at a rate of 200 L/min using a submersible pump.

Water samples taken prior to the treatment startup showed a nitrate concentration as high as 34 mg/L with an average nitrate concentration in the pumping well PZ-66 of 29 mg/L. Addition of a conservative tracer (NaCl) to ethanol amended groundwater was used to follow the transport of ethanol-amended groundwater. Sampling of monitoring wells one month after the treatment startup showed an increase of the Cl concentration in the monitoring well (PZ-56) located between the pumping and the injection wells. This increase was indicative of the treatment progress. Moreover, the second sampling campaign which was carried out two and a half months after the treatment startup, demonstrated a nitrate concentration of 12 mg/L in the pumping well and zero nitrate levels in the monitoring well PZ-71 located between the injection wells (Table 1). These measurements were indicative of the treatment success. Consequently, after 70 days of operation, the treatment was terminated.

TABLE 1

Nitrate and nitrite levels in groundwater during and after water treatment. Sampling depth is given in brackets.

| Well | NO3-N, mg/L | | | NO2-N, mg/L | |
|---|---|---|---|---|---|
| | 19-21/6 | 19-21/7 | 10/8 | 19-21/6 | 10/8 |
| Pumping well (PZ-66) | 29.1 | 24.8 | 11.4 | 0 | Nd |
| Monitoring well PZ 71(20) | 22.1 | 11.5 | 7.4 | 0 | 0.3 |
| Monitoring well PZ 71(27) | 25.3 | 29.6 | 6 | 0 | 0.1 |
| Monitoring well PZ 71(33) | 1.7 | 0.9 | 0 | 0 | 0.3 | nd-not determined.

Accordingly, it is apparent that extensive physico-chemical characterization of the site confirmed elevated concentrations of nitrate around the east-west runways. The amount of nitrate (expressed as nitrogen) accumulated over the 40 year period of deicing with urea is estimated at around 2000 ton. Little or no denitrification was observed at the contaminated site due to insufficient concentration of a carbon source. Consequently, aerobic conditions at the site prevented denitrification from occurring.

Microbial counts and laboratory tests confirmed good potential for site cleanup by the indigenous population of denitrifying bacteria. Biological denitrification, however, required active intervention to provide bacteria with a sufficient amount of a carbon source. The required carbon source was delivered by groundwater amendment in ethanol. In the pilot test, a part of contaminated aquifer was successfully remediated using a mobile denitrification unit mounted on a portable vehicle according to the invention. Results of the field test confirmed the efficiency of the proposed method and apparatus.

What is claimed is:

1. A method for biological denitrification of groundwater in situ in an aquifer under substantially anaerobic conditions, comprising (a) providing a network, including an extraction well for removal of groundwater from the aquifer and a plurality of injection wells for returning groundwater to the aquifer, the injection wells being arranged in a line substantially perpendicular to the direction of groundwater flow, the extraction well being located downstream or upstream of the line of injection wells, and the spacing of the wells and the number of injection wells being determined by the mathematical relationship $$J = \frac{C_p + nC_I}{W} \to \min \quad (1)$$

where J is the cost of treatment, $C_P$ and $C_I$ are the costs of extraction and injection wells, respectively; n is the number of injection wells, and W is the distance across the protected area, and wherein the water stream is evenly distributed between injection wells, according to the relationship:

$$F_i = F_e/n = const \quad (2)$$

where F is the water flow rate (e—extraction well, i—injection well) and n is the number of injection wells, (b) removing groundwater from the aquifer by the extraction well, (c) adding a carbon source to the groundwater in a controlled manner, (d) returning the carbon source amended groundwater to the aquifer by the injection wells in even distribution, the water flow rate being controlled, and (e) monitoring the nitrate concentration of the groundwater removed from the extraction well, a decrease in nitrate concentration being indicative of denitrification.

2. A method according to claim 1, including the preliminary steps of (i) enumerating indigenous populations of denitrifying bacteria in the groundwater, and (ii) evaluating the feasibility of substrate stimulated denitrification of the groundwater.

3. A method according to claim 1, wherein the method is continuous.

4. A method according to claim 1, wherein 2 to 4 injection wells are provided.

5. A method according to claim 1, wherein after step a), when required, adjusting the distance between injection wells.

6. An apparatus for biological denitrification of groundwater in situ in an aquifer under substantially anaerobic conditions, comprising (a) network means, including an extraction well for removal of groundwater from the aquifer and a plurality of injection wells for returning groundwater to the aquifer, the injection wells being arranged in a line substantially perpendicular to the direction of groundwater flow, the extraction well being located downstream or upstream of the line of injection wells, and the spacing of the wells and the number of injection wells being determined by the mathematical relationship $$J = \frac{C_p + nC_I}{W} \to \min \quad (1)$$

where J is the cost of treatment, $C_P$ and $C_I$ are the costs of extraction and injection wells, respectively; n is the number of injection wells, and W is the distance across the protected area, and wherein the water stream is assumed to be evenly distributed between injection wells, according to the relationship:

$$F_i = F_e/n = const \quad (2)$$

where F is the water flow rate (e—extraction well, i—injection well) and n is the number of injection wells, means for removing groundwater from the aquifer by the extraction well, (b) means for adding a carbon source to the groundwater, (c) means for returning the carbon source amended groundwater to the aquifer by the injection in even distribution, (d) means for controlling water flow rate and addition of carbon source, and (e) means for monitoring the nitrate concentration of the groundwater removed from the extraction well, a decrease in nitrate concentration being indicative of denitrification of the groundwater.

7. An apparatus according to claim 6, wherein extraction well includes a submersible pump.

8. An apparatus according to claim 6, wherein means for returning the carbon source amended groundwater to the aquifer by the injection wells in even distribution comprises a valve.

9. An apparatus according to claim 6, wherein the means for adding a carbon source to the groundwater comprises a pump.

10. An apparatus according to claim 6, wherein means for controlling water flow rate addition of carbon source comprises a computer.

11. An apparatus according to claim 6, mounted on a portable vehicle.

12. An apparatus according to claim 6, wherein 2 to 4 injection wells are provided.

\* \* \* \* \*